July 27, 1937.  V. FOLLET  2,088,321
FIXTURE JOINT
Filed June 10, 1936
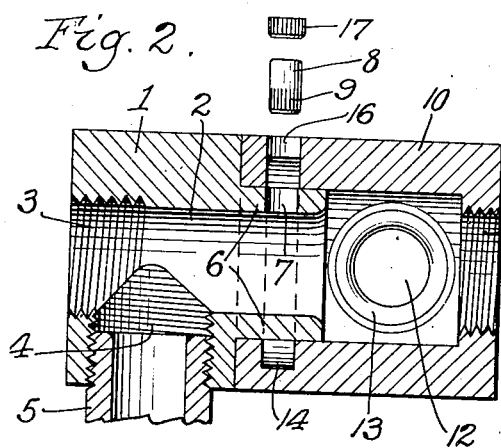
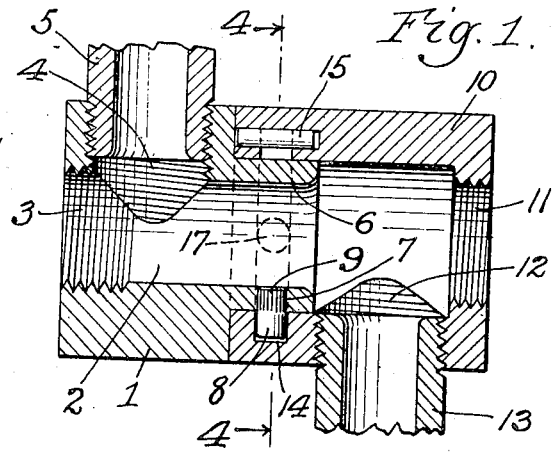
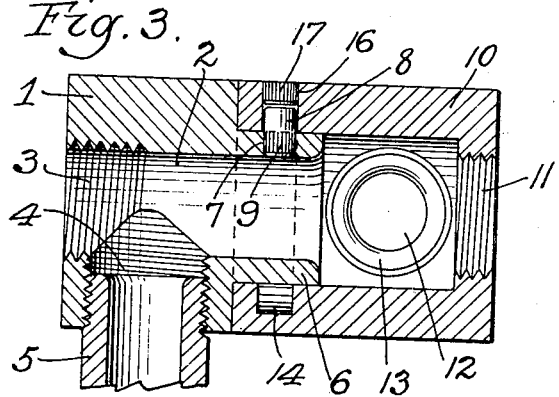
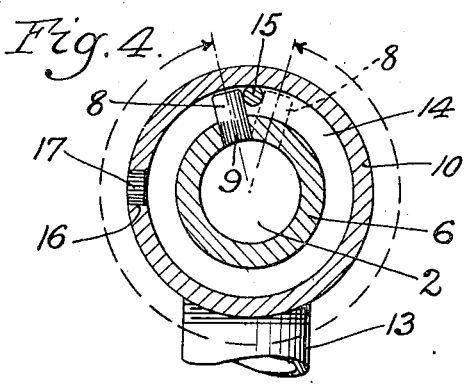
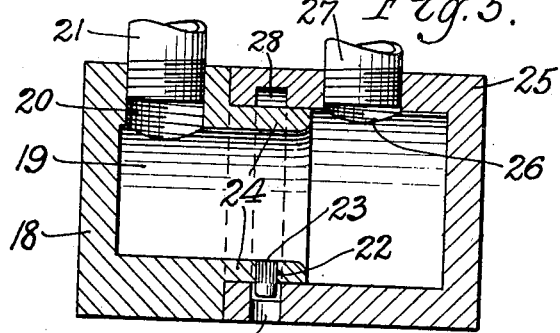
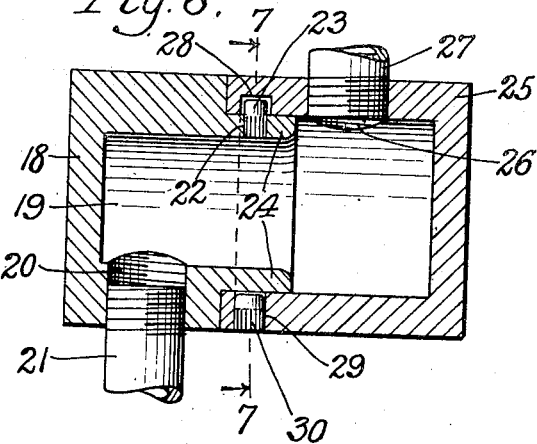
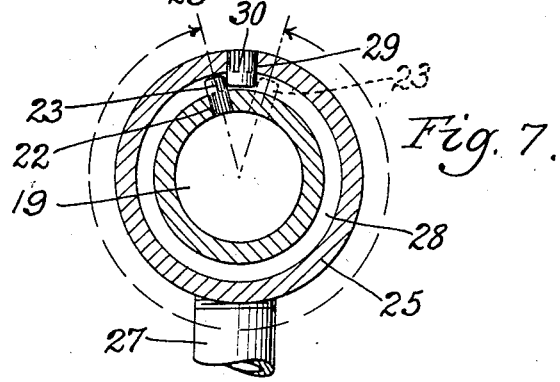
Inventor
Vermont Follet
by Parker & Carter
Attorneys.

Patented July 27, 1937

2,088,321

UNITED STATES PATENT OFFICE 2,088,321

FIXTURE JOINT

Vermont Follet, Elmhurst, Ill., assignor to Standard Screw Company, Hartford, Conn., a corporation of New Jersey Application June 10, 1936, Serial No. 84,448

3 Claims. (Cl. 285—1)

This invention relates to a fixture joint of the type in which two relatively movable housing or fixture members are joined, and means are provided for limiting their relative movement.

It has one object to provide means for enclosing an electric conduit and for limiting the movement of the relatively movable parts to less than 360°.

Another object is to provide in such a member means for assembling the joint in which the limiting means serve also as the holding means by which the two relatively movable parts are joined together. Another object is to provide means in connection with such a joint whereby the holding parts are invisible.

Another object is to provide means in connection with such a joint whereby the joint cannot be taken apart without destruction.

Other objects will appear from time to time in the specification and claims.

The invention is illustrated more or less diagrammatically in the accompanying drawing, wherein:—

Figure 1 is a longitudinal section through one form of the joint;

Figure 2 is a similar view with the parts in modified position illustrating the insertion of one of the holding pins;

Figure 3 is a view similar to Figure 1, showing the pin inserted;

Figure 4 is a transverse section taken at line 4—4 of Figure 1;

Figure 5 is a view generally similar to Figure 1, illustrating a modified form;

Figure 6 illustrates the modified form of Figure 5 with the parts in a different position; and Figure 7 is a transverse section taken at line 7—7 of Figure 6.

Like parts are designated by like characters throughout the specification and drawing.

1 is a housing or joint member, hollow at 2. The outer end of the hollow portion 2 may be interiorly threaded as at 3. A threaded opening 4 may be provided in the section 1 to receive a correspondingly threaded conduit, tube or equivalent member 5. The member 1 is provided with a reduced portion 6 in which a perforation 7 is formed. A pin 8 is finally seated in the perforation 7. The pin is preferably provided with a knurled, roughened or threaded portion 9 to engage the walls of the perforation 7 and make surer the seating of the pin in the perforation.

The second main member of the joint comprises a hollow part 10 which may be provided in its outer end with a threaded perforation or opening 11 and may also have a second angularly disposed threaded perforation 12 within which a correspondingly threaded tube, conduit or other fitting 13 may be seated. An annular groove 14 is formed in the inner face of the member 10 and the pin 8 may lie in this groove when the parts are assembled. This relationship is illustrated particularly in Figure 1. A pin 15 is positioned in a suitable perforation or cavity in the member 10 and extends through and partially blocks the annular groove 14 as illustrated particularly in Figures 1 and 4. A perforation 16 is formed in the side wall of the member 10 and when the parts are finally assembled a plug 17 is seated in this perforation to close it. The plug may be knurled, threaded or otherwise roughened on its exterior to assist in its seating in the perforation 16.

The assembly of the parts in the form of the device illustrated in Figures 1 to 4, inclusive, is as follows: Preferably first the pin 15 is inserted in position as shown in Figure 1. The two main parts 1 and 10 are then moved into the position shown in Figure 2 and since the end of the member 10 abuts against the end of the member 1, the pin 15 cannot fall out even though it may fit loosely into the perforations within which it is seated. The parts 1 and 10 are moved into the position of Figure 2 in which the perforation 16 is in line with the perforation 7. The pin 8 may then pass through the perforation 16 to be seated in the perforation 7 as shown in Figure 3. When so seated it lies within the groove 14 thus permitting relative rotational movement of the parts, limited only by the possible contact of the pin 8 with the angularly disposed pin 15. This contact, and the limit of relative rotation of the parts, are illustrated in Figure 4. When the pin 8 is properly seated the plug 17 is driven into place, being seated as shown in Figures 3 and 4, and closing the perforation 16. The pin is preferably ground into shape so that it forms in effect a continuation of the outer surface of the member 10 and is in fact substantially invisible. Users of the device ordinarily cannot discover the location of the plug and if they do so they are unable to remove it and hence are unable to disassemble the joint. This is an important feature of the invention because where such joints are used to house or contain electrical conduits, underwriters generally require that the joints be so made that they cannot be disassembled by the ultimate user. In this way the danger of tampering and of fire is reduced and the safety of the device is increased.

The apparatus of the first four figures may be used with or without the side openings 4 and 12 and with or without the end openings 3 and 11. Ordinarily, of course, there will be some opening in each of the sections 1 and 10. There may be two or more openings in each section but the invention is not limited to any particular number of openings. In usual practice an opening is necessary in each section to permit the connection of a conduit and another opening may be used to receive a fastening or securing means where the joint is mounted upon or connected to a standard or support of some sort.

A modified form of the invention is illustrated in Figures 5, 6 and 7. As there shown, one main section 18 is provided with a hollow 19, an interiorly threaded opening 20 in which a conduit or pipe 21, correspondingly threaded, may be seated. The member 18 is reduced as at 24 and provided with a perforation 22 to receive a pin 23. 25 is a second main member of this form of the joint. It may be provided with an internally threaded opening 26 in which an exteriorly threaded pipe or conduit 27 is seated and has formed on its inner face an annular groove 28 within which the pin 23 may project, as shown in Figures 5, 6 and 7. The side wall of the member 25 is pierced as at 29 to receive an inwardly projecting pin 30 which projects into and interrupts the annular groove 28. As illustrated particularly in Figure 7 the two pins in co-operation determine the relative rotational movement possible and limit it to something less than 360°.

As shown perforation 22 of the reduced portion 24 of the member 18 is of less diameter than the perforation 29 of the member 25. Thus the original assembly of the parts may be accomplished as follows: First the housing or joint members 18 and 25 are placed in the position shown in Figure 5 in which the perforations 22 and 29 are in register. The pin 23 may be inserted freely through the perforation 29 and is driven to a seat in the perforation 22. Knurling, threading or any other form of roughening may be about the exterior of the pin to insure a permanent and tight seat in the perforation 22. After the pin 23 is seated, the parts are moved to the position shown in Figure 6 in which the perforations 22 and 29 are out of register. The pin 30, which is larger than the pin 29 is then driven or forced to a tight seat in the perforation 29. This pin also may be threaded, knurled or otherwise roughened to insure a tight seat in the perforation 29 and when seated its outer end is ground to conform to the shape of the outer surface of the member 25 to prevent disassembly of the parts and to conceal as far as possible its location. This form of the apparatus has therefore the same general advantages as those mentioned in connection with the earlier form, namely, that the ultimate user cannot locate the joint and cannot take it apart without completely destroying it. It is thus constructed to avoid the danger of being taken apart and reassembled improperly.

The two forms of the device have in common a number of features. An important feature common to the two is that the members which limit the rotational movement of the parts serve also to hold them together, these members comprising the only holding means. Another important feature common to the two forms is that the holding members are invisible and the parts cannot be disassembled without destruction and, therefore, cannot be reassembled should a user break or cut them apart. In the form shown in the first four figures one of the limiting members, namely, the pin 15, is or may be held in place not directly by itself but by the fact that it is inserted through the end of the member 10 which end abuts against the member 1 when the parts are assembled. Therefore this limiting member 15 cannot fall out even though it might be loosely in position. In this form of the invention also the second holding member, namely, the pin 9, holds the two parts of the housing 1 and 10 together, and it also is invisible, lying completely inside of and being spaced inwardly from the outer surface of the member 10. Thus in this form of the device both holding members lie wholly within the joint housing.

I claim:

1. In combination in a joint, a pair of integral, hollow housing members, one having a reduced portion penetrating within the other, the two members when assembled comprising an enclosure, an annular groove formed on the inner surface of the outer member, a perforation formed in said annular groove and extending through to the exterior of said outer member, a perforation formed in the penetrating part of the inner member, in alignment with the said groove when the two parts of the joint are in assembled position, said perforation being of less diameter than the perforation formed in the outer member, a pin seated within the perforation of said inner member and extending into said groove, said pin when seated in said perforation being entirely enclosed within the joint, being inaccessible from the outside and retaining the housing members against axial separation, said pin being smaller in diameter than the perforation in said exterior member and larger in diameter than the perforation in said interior member.

2. In combination in a joint, two members associated together for limited relative rotational movement, one of said members provided with a reduced portion penetrating within the other, a pin seated groove in the surrounding member, a pin seated within said penetrating member and extending within said groove, said pin being inaccessible from the outside and lying entirely within said joint and holding the two members against separation, and a second pin seated in the other member and also extending into said groove, the two pins adapted to contact with each other and to limit thereby the relative rotation of the two members.

3. In combination in a joint, two members associated together for limited relative rotational movement, one of said members provided with a reduced portion penetrating within the other, a pin seated groove in the surrounding member, a pin seated within said penetrating member and extending within said groove, said pin being inaccessible from the outside and lying entirely within said joint and holding the two members against separation, and a second pin seated in the other member and also extending into said groove, the two pins adapted to contact with each other and to limit thereby the relative rotation of the two members, and a perforation in the outer member through which said first mentioned pin is inserted into said penetrating member, when the two members are assembled together.

VERMONT FOLLET.